(No Model.)

J. PORTEOUS.
RAISIN STEMMER.

No. 362,228. Patented May 3, 1887.

Witnesses,
Geo. H. Strong.
J. H. Nurse.

Inventor,
James Porteous
By Dewey & Co.
attys

UNITED STATES PATENT OFFICE.

JAMES PORTEOUS, OF FRESNO, CALIFORNIA.

RAISIN-STEMMER.

SPECIFICATION forming part of Letters Patent No. 362,228, dated May 3, 1887.

Application filed January 21, 1887. Serial No. 225,040. (No model.)

*To all whom it may concern:*

Be it known that I, JAMES PORTEOUS, of Fresno, county of Fresno, and State of California, have invented an Improvement in Raisin-Stemmers; and I hereby declare the following to be a full, clear, and exact description thereof.

My invention relates to the class of machines used for stemming raisins; and my invention consists in an outer fixed open-ended truncated cone arranged in a perpendicular position, a fixed hopper in communication with the upper end of said cone, a rotating inner cone perpendicularly arranged, the apex of said cone extending into the hopper and its body working within the outer cone, said inner rotating cone having a diameter enough less than the diameter of the outer fixed cone to leave an intervening annular space for the passage of the raisins.

My invention further consists in the adjustability of the inner rotating cone, whereby the capacity of the raisin-passage is varied, the means for accomplishing this adjustment while the cone is in motion, the peculiarities of the raisin-passage between the two cones, and details of construction, all of which I shall hereinafter fully explain.

Figure 1:
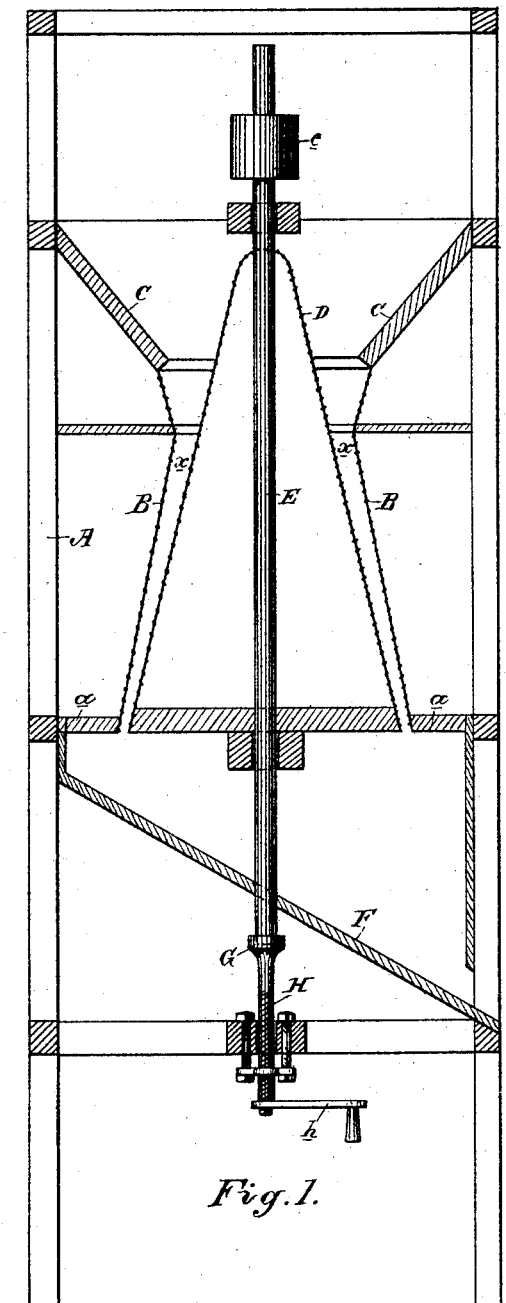
Figure 2:
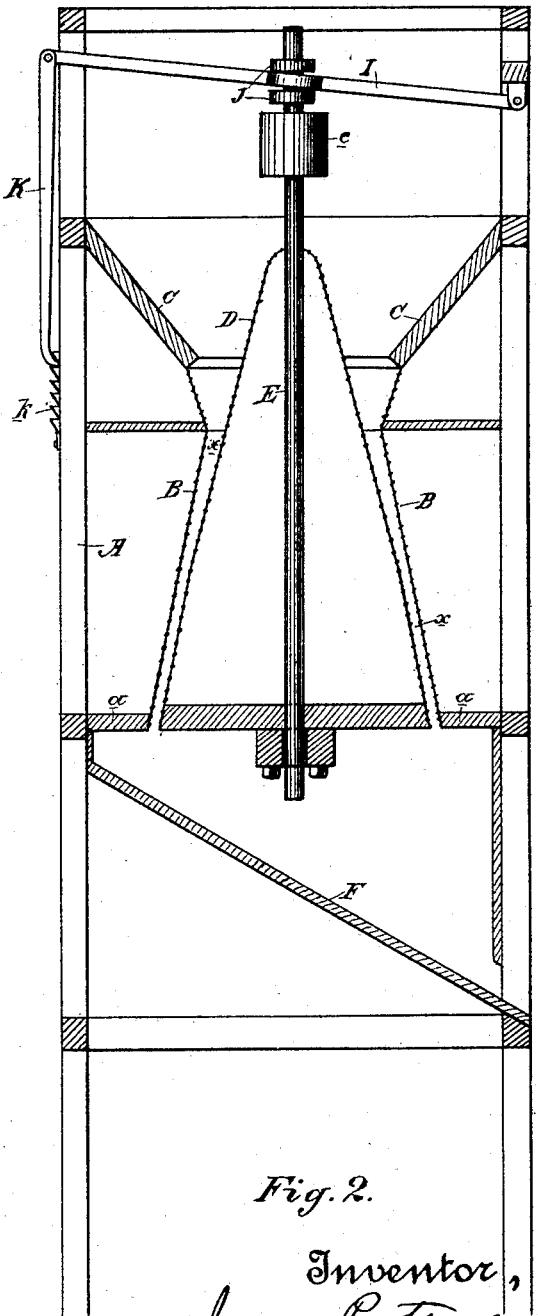

Referring to the accompanying drawings, Figure 1 is a vertical section of my raisin-stemmer, showing the means for vertically adjusting the inner cone from below. Fig. 2 is a similar view showing the means for adjusting it from above.

The object of my invention is to provide a simple and effective raisin-stemmer with the greatest working capacity.

A is the frame or stand, in the cross-pieces *a* of which is fixed the outer open-ended truncated cone, B, perpendicularly arranged, as shown. This cone is made of wire-cloth, as is usual in machines of this class.

C is the hopper, which communicates with the upper end of the fixed cone B.

D is the inner cone, perpendicularly arranged, its base being in the same horizontal plane as the base of the outer cone, while its apex extends upwardly through the top of said cone and into the hopper C. This inner cone is also made of wire-cloth, and its diameter is enough smaller than that of the outer cone to leave an annular passage, *x*, for the raisins. The inner cone is mounted upon a vertical central shaft, E, to which power is applied, by any suitable means, through the pulley *e*, whereby a rapid rotary motion is imparted to said inner cone.

The operation of the machine, as far as described, is as follows: The unstemmed raisins are placed in the hopper, and thence find their way down into the passage *x*, where, being subjected on one side to the rapidly-rotating inner cone and impeded on the other side by the fixed outer cone, their stems are torn from them, and both stems and raisins thus disconnected pass out from the base of the passage and fall into the discharge-chute F, by which they are delivered to the other machinery, which need not here be described. Now, by reason of the upwardly-projecting apex of the inner cone within the hopper, the raisins in said hopper are prevented from clogging and are given a positive feed, due to the motion of the inner cone in the midst of the mass. In order to perfect this feed and prevent any tendency to clogging at the entrance of the passage *x*, I make the upper portion of said passage wider than its lower portion by so constructing the two cones that their walls converge toward their bases. This I have shown in Fig. 1. In Fig. 2 I have shown a modification in this respect by making this convergence of the walls stop short of the bases of the cones, said walls proceeding from this point parallel with each other. This latter construction has a tendency to separate the small pairs and bunches of raisins. Now, in order to vary the capacity of the raisin-passage to suit different sizes and kinds of raisins, and also to make the machine clear itself if it clogs, I make the inner rotating cone vertically adjustable while in motion, whereby the capacity of the raisin-passage is increased or diminished, as required. This I may accomplish in many ways, though I have here shown but two. The method shown in Fig. 1 is from below, and consists of a step or cup, G, into which the lower end of the cone-carrying shaft E is fitted. This step or cup is on the upper end of or is carried by a screw, H, furnished with a handle, *h*, by which it may be operated. By turning this screw up the inner cone is raised, thereby decreasing the capacity of the raisin-passage, and by turning the screw down the inner cone moves down of its own weight, thereby increasing its capacity. By lowering the inner cone it clears itself without stopping the machine.

In Fig. 2 I show a pivoted lever, I, engaging collars J on the upper end of the central shaft, E, said lever being raised and lowered by means of a handle, K, engaging a ratchet, k, whereby it is held in position.

In order to remove the inner cone when necessary for the purpose of cleaning it or for any other object, I make the floor or bottom of the discharge-chute F removable, so that when removed the inner cone may be lowered completely from the outer one.

I am aware of raisin-stemmers in which concentric cones made of wire-cloth, the outer cone being fixed and the inner cone rotating, have been used; but in all these machines the cones have been arranged in a horizontal position, and the feed into the raisin-passage between them takes place through a slot or aperture in the side wall of the outer cone, and not through its top, as is the case with my machine, by reason of the perpendicular arrangement of the cones.

The advantages which are obtained by reason of this perpendicular arrangement are so great as to render a machine constructed similar to mine of a far greater working capacity. This is due in part to the fact that by feeding at the top the entire area of both cones is utilized, and especially their entire length, which cannot be the case where the feed is made through the side; and, again, there being no break in the side, it is obvious that the entire circumference of both cones is utilized instead of only one-half, as is the case where they are arranged horizontally, because in the latter case it is only the lower halves of the cones which are of use, as the raisins are not brought up around the upper portion, while in my machine they completely encircle the cones.

The advantage of rapidity of operation which I have by the use of my machine is due to the better utilization of gravity, for the reason that by the perpendicular arrangement the raisins, both under the force of gravity and the centrifugal force due to the inner cone, are rapidly and freely passed through the raisin-space. This is not the case in the horizontal machines, for the reason that the discharge takes place only by the slope of the sides of the outer cone.

Having thus described my invention, what I claim as new, and desire to secure by Letters Patent, is—

1. In a raisin-stemmer, the combination of an outer fixed open-ended cone, arranged perpendicularly, with an inner rotating cone, also arranged perpendicularly, and having a diameter enough smaller than that of the outer cone to leave an annular passage or space for the raisins between the walls of the two cones, said cones being constructed of wire-cloth, substantially as described.

2. In a raisin-stemmer, the combination of an outer fixed open-ended wire-cloth cone arranged perpendicularly, a hopper in communication with its upper end, and a rotating wire-cloth cone arranged perpendicularly within the outer cone, and having a diameter enough less than that of the outer cone to leave an annular space for the raisin-passage between the walls of the two cones, substantially as described.

3. In a raisin-stemmer, the combination of the outer fixed open-ended wire-cloth cone with the rotating longitudinally-adjustable inner wire-cloth cone having a diameter less than that of the outer cone, whereby an annular passage for the raisins is formed, the capacity of which may be varied by the adjustment of the inner cone, as described.

4. In a raisin-stemmer, the outer fixed open-ended wire-cloth cone, in combination with the inner rotating wire-cloth cone, leaving a space for the raisins between the two cones, the shaft E, on which the inner cone is mounted and by which it is rotated, and the means for vertically adjusting the inner cone while in motion, consisting of the handled screw H, having the step or cup G in its top, in which the lower end of the shaft fits, substantially as described.

5. In a raisin-stemmer, the outer fixed open ended cone, in combination with the inner rotating cone, the walls of which and those of the outer cone converge downwardly a certain distance, and thence extend in parallel planes, substantially as described.

6. The raisin-stemmer consisting of the outer fixed open-ended wire-cloth cone, the hopper communicating with its top, the vertically-adjustable rotating inner wire-cloth cone, the apex of which extends into the hopper, and the discharge-chute F below the two cones, substantially as described.

In witness whereof I have hereunto set my hand.

JAMES PORTEOUS.

Witnesses:
S. H. NOURSE,
H. C. LEE.